June 28, 1955
A. H. CARLAND
2,711,779
METHOD AND APPARATUS FOR SEVERING AND JOINING
LAYERS OF THERMOPLASTIC MATERIAL
Filed April 17, 1950
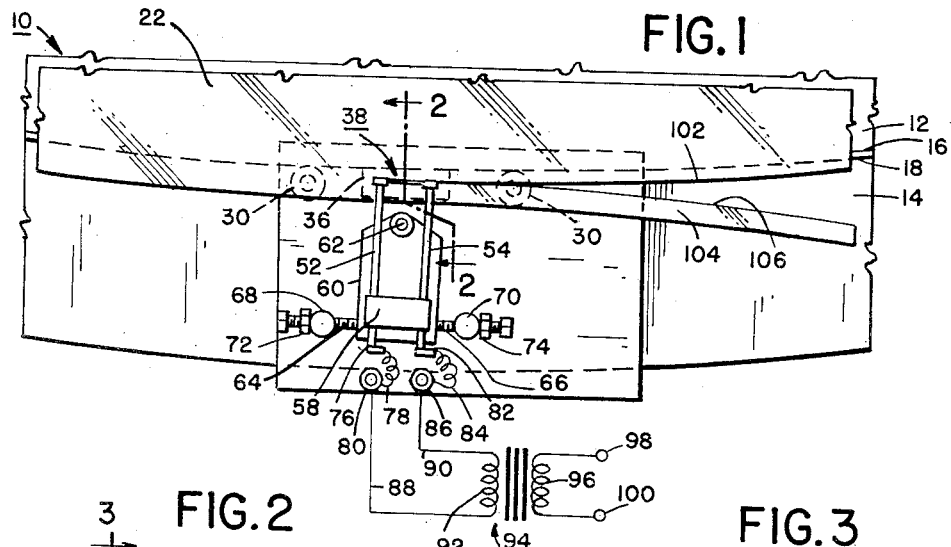
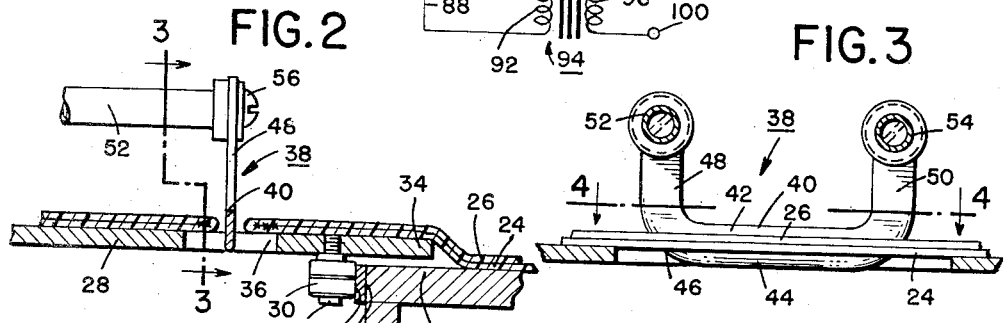
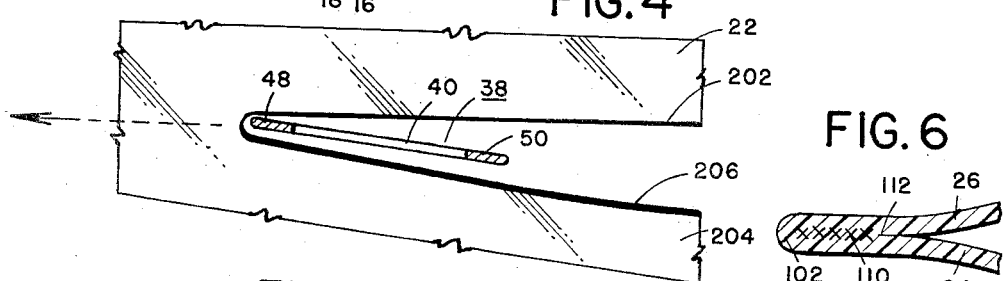
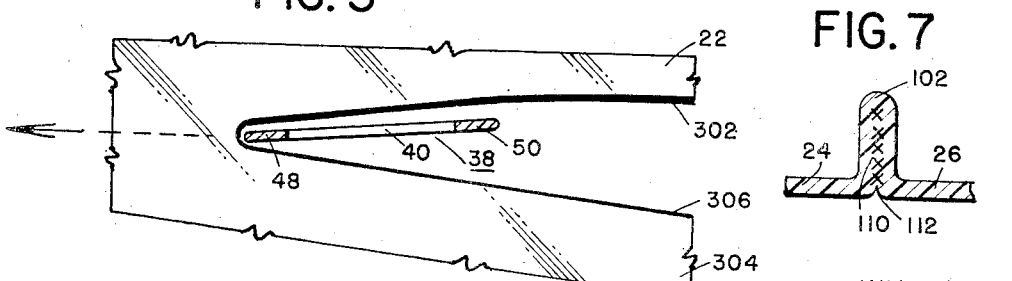
INVENTOR:-
ALTON H. CARLAND
BY William C. Babcock
ATTORNEY United States Patent Office 2,711,779
Patented June 28, 1955

2,711,779

METHOD AND APPARATUS FOR SEVERING AND JOINING LAYERS OF THERMOPLASTIC MATERIAL

Alton H. Carland, Hopkins, Minn., assignor to General Mills, Inc., a corporation of Delaware Application April 17, 1950, Serial No. 156,475

10 Claims. (Cl. 154—42)

This invention relates to improved methods and apparatus for joining layers of thermoplastic material and more particularly to methods and apparatus involving the simultaneous cutting and welding of superimposed layers.

Various methods have been proposed in the prior art for simultaneously severing and joining a plurality of layers of thermoplastic material. Some of these prior methods have involved the use of heated dies or wires which move transversely through the plane of the material. The length of the seam which can be made in such a device, and the amount of the material which can be handled in it are substantially limited by the difficulty of supporting and moving a relatively large heated member, and also by the intermittent nature of the operation.

With these difficulties and problems of the prior art in view, it is accordingly one object of the present invention to provide an improved method and apparatus for severing and joining superimposed layers of thermoplastic material.

A further object is the provision of an apparatus of this type which can be operated continuously, rather than intermittently, and which is capable of making seams of relatively great length.

Another object is the provision of an improved continuous method for cutting and joining layers of thermoplastic material, which is particularly suitable for use with polyethylene.

A further object is an improved method of cutting and joining layers of polyethylene sheet material.

A further object is the provision of a cutting and sealing apparatus in which an electrically heated resistance member is supported substantially in the plane of the material to be joined.

A still further object is the provision of such an apparatus in which an electrically heated resistance member is supported in the plane of the material to be joined and is mounted for relative movement with respect to the material in a direction axially or longitudinally of the resistance element.

Other objects and advantages of the present invention will be apparent from the following specification in which certain preferred embodiments have been described with particular reference to the accompanying drawings.

In these drawings, wherein like reference characters indicate like parts,

Figure 1 is a partial plan view of a cutting and seaming apparatus according to the invention.

Fig. 2 is a sectional view on the line 2—2 of Fig. 1.

Fig. 3 is a sectional view of the line 3—3 of Fig. 2.

Fig. 4 is a partial sectional view corresponding to the line 4—4 of Fig. 3, but showing an alternate adjustment of the apparatus of Fig. 1.

Fig. 5 is a view similar to Fig. 4 illustrating still another adjustment of the apparatus of Fig. 1.

Fig. 6 is an enlarged sectional view showing details of the seam formed by the apparatus of Fig. 1 while the sheets of thermoplastic material are still superimposed, and Fig. 7 is a sectional view showing details of the seam of Fig. 6 after the layers of thermoplastic material have been opened into a common plane.

As shown in Fig. 1, the preferred form of apparatus for carrying out the methods of the present invention includes a supporting table designated generally as 10 for the layers of thermoplastic material to be cut and joined. This supporting table 10 includes a main body or supporting portion 12 for the main body of thermoplastic material to be seamed, and a downwardly offset marginal supporting portion 14 on which the movable welding apparatus of the invention may be mounted.

The edge 16 of the main upper table portion 12 is provided with a metallic edge or guide strip 18 for determining the path followed by the welding device described below. This edge 16 of table portion 12 and its guide strip 18 are shaped, as seen in the plan view of Fig. 1, to correspond to the particular seam desired between the layers of thermoplastic material.

This thermoplastic material is designated generally at 22 and, as indicated above, the main body portions of the material are supported on the table area 12. For purposes of illustration, and in accordance with the preferred form of the invention, two superimposed sheets or layers of material are provided as designated at 24 and 26, respectively, in Fig. 2.

The cutting and seaming mechanism which is used in combination with the above described table arrangement includes a supporting body portion which is illustrated in the form of a substantially horizontal plate 28. This main body or supporting portion 28 is provided on its under surface with a pair of rollers, each designated at 30 and rotatably mounted on vertical spindles 32 fastened to plate 28. These rollers are located adjacent one edge of the supporting plate 28 and at the front and rear thereof, respectively. The rollers 30 are designed to engage the guide strip 18 at the edge of the upper table portion 12 in order that relative movement may be caused between the cutting and seaming mechanism carried by plate 28 and the superimposed layers of thermoplastic sheet material supported on the table portion 12. In the form illustrated in the drawings, the supporting plate 28 is designed to be moved with respect to the table 12 by hand, with the rollers 30 pressed against the guide strip 18. Obviously suitable motor means could also be provided to establish the necessary relative movement.

Supporting frame or plate 28 has an inner edge 34 which extends slightly over the edge portion of table area 12. Thus the superimposed sheets 24 and 26 of thermoplastic material are supported substantially horizontally on the upper surface of the plate 28 throughout the area which is to be cut and joined.

At the point where the desired seam is to be formed, the plate 28 has a cut-out portion or opening 36 to receive the novel cutting and seaming member 38 of the present invention. This welding member 38 is formed of electrical resistance material and includes a main body portion 40 which extends longitudinally over a substantial distance in the plane of the sheets 24 and 26 as the latter are supported on the upper surface of plate 28. The main body portion 40 of the resistance element 38 has an upper edge 42 and a lower edge 44 which are spaced vertically a distance substantially greater than the combined thickness of the layers 24 and 26. This welding member 38 is designed to be heated by the passage of an electric current through it, and the relative orientation, shape, and proportions of the various parts constitute important features contributing to the practical operation of the device.

Thus while the vertical height or thickness of the main body portion 40 is relatively great as compared to the thickness of the thermoplastic layers, the lateral thickness from side to side of the main body portion 40 is relatively small as illustrated in Fig. 2. In other words, the cross section of this main body portion is substantially rectangular, with the axis of greater dimension extending vertically.

At its forward end, the main body portion 40 is curved smoothly upwardly as indicated at 46 to provide a vertical terminal portion 48 at the forward edge of the device. Similarly, the rear end of the main body portion 40 is curved upwardly to provide a rear vertical terminal portion 50.

The forward and rear terminal portions 48 and 50, respectively, are connected to and supported by electrically conducting rods 52 and 54. The connection between the parts is achieved by suitable bolts 56 or other fastening devices.

The conducting and supporting members 52 and 54 are preferably made of hollow metallic tubing in order to obtain the desired strength and rigidity. These supporting and conducting rods 52 and 54 are supported at their outer ends in an insulating block 58. This insulating block is mounted on a movable supporting plate 60 which is pivoted at 62 on a vertical axis for relative rotary adjustment with respect to the main frame or supporting plate 28 of the welding portion of the mechanism. It should be noted that the axis of rotation 62 for this supporting plate 60 for the electrically heated cutting and welding member 38 is located substantially close to the welding member itself. Thus relative rotary adjustment of the plate 60 about its pivot 62 will cause angular adjustment of the main body portion 40 of the welding member 38 with respect to the supporting plate 28 and also with respect to the guide member 18 on the edge of table portion 12.

The relative angular adjusted position of the plate 60 and consequently of the electrically heated welding member 38 is determined by adjustable stops 64 and 66 which are threaded in supporting posts 68 and 70, respectively, at the forward and rear edges of the plate 60. Lock nuts 72 and 74 serve to maintain the adjusting screws 64 and 66 and consequently the plate 60 in adjusted position.

As shown in Fig. 1, the electrically conducting and supporting rods 52 and 54 extend through the insulating member 58. The outer end 76 of conducting member 52 is connected by a suitable wire 78 to a terminal 80 on the supporting frame 28 of the device. Similarly, the outer end 82 of conducting and supporting rod 54 is connected by a wire 84 to a second terminal 86 on the supporting plate 28.

Terminals 80 and 86 are connected, in turn, by wires 88 and 90, respectively, to the secondary coil 92 of a suitable transformer 94. The primary circuit 96 of transformer 94 is suitably connected to line terminals 98 and 100 which may be in electrical circuit with a 110 volt alternating current supply line or a suitable other power source.

The characteristics of the power source connected to terminals 98 and 100 and the characteristics of the transformer 94 are chosen so that the current through the main body portion 40 of the electrical welding member 38 will heat said body portion to the particular temperature desired for the welding operation at hand. Preferably, according to the present invention, the temperature of the welding member 38 will lie within the range from 900° F. to 2000° F., particularly for use in the cutting and joining of superimposed layers of polyethylene. By way of example, the main body portion 40 of the welding member may be formed of flat resistance wire such as the well-known nickel chromium alloys sold under the names Nichrome, Chromel A, etc., which is ⅛ inch wide by .020 inch size. With a resistance of .217 ohms per foot, such a wire can be operated at 3 to 4 volts to pass 15 to 20 amperes of current and will be maintained at a red heat within the above temperature range. The relative sizes and voltages can be adjusted to vary the exact temperature within the specified range.

As shown in Fig. 1, the method of operation of the welding apparatus just described involves the relative movement of the welding member 38 so that its main body portion 40 moves longitudinally or axially substantially in the plane of the superimposed layers 24 and 26. As the supporting plate 28 is moved from the right to the left in Fig. 1, the electrically heated wire portion 40 will move along the plane of the material and will pass through the material to sever it as indicated by the line 102 in the drawing. A waste strip 104 will accordingly be severed. The electrically heated welding member 38 is maintained at such a relatively high temperature, that the material of the thermoplastic layers is melted and severed by the approach of the leading edge of the wire. The use of a longitudinally extending wire, and the relative movement of the wire along its axis provides for the continued application of heat to the severed edges of the material and thus further melts the material and fuses it to provide a seam 102 on the main body portion of the respective layers and a secondary or further seam 106 at the inner edge of the waste strips 104. The continued application of heat by this longitudinally extending heated wire thus provides a fused seam which is relatively strong and which is generally superior to the seams formed by the intermittent operations of the prior art devices previously described. Furthermore, the use of temperatures within the specified range melts the material of the thermoplastic layers sufficiently so that the severing of the layers actually takes place slightly in advance of the heated wire member. Thus actual contact between the thermoplastic layers and the wire member is avoided.

In the case of polyethylene, it is preferable to maintain the heated cutting and welding wire at a temperature greater than the ignition or burning point of the thermoplastic material itself. The use of such temperatures insures the burning of any particles of the material which actually come in contact with the heated welding member and also increases the tendency of the material to melt away from the wire member without actual contact with such member. Thus the heated and fused layers of thermoplastic material tend to shrink away from the welding member to a slight extent. Even though the actual temperature of the welding member is above the ignition point of the material, the relative movement of the member through the material in the plane thereof and longitudinally of the wire prevents sustained combustion of the thermoplastic layers at any given point, since the welding wire moves continuously from point to point and thus can not sustain combustion at any one location.

As illustrated in Figs. 4 and 5, the nature of the seam which is formed by this device can be varied by relative angular adjustment of the support 60 on its axis 62. Thus in Fig. 4, the welding member is illustrated as tilted so that its trailing edge is farther away from the main body of material 22 than its leading edge 48. The relative direction of movement of the welding member 38 is illustrated by the arrow in the figure. With this relative orientation of the parts, there is a tendency to form a relatively light bead of material 202 as the seam on the main body portion of the layers, and to form a relatively heavy seam or bead 206 on the strip of scrap material 204 which is severed.

On the other hand, if it is desired to provide a relatively heavier seam on the main body portion 22 of the layers, the angular adjustment of the electrically conducting welding member may be changed to the position shown in Fig. 5. In this position the leading edge 48 of the welding member is farther away from the main body of the material than is the trailing edge 50. There is accordingly a tendency to form a relatively heavy seam 302 between the superimposed layers of the main body portion 22 of material and to form a relatively light seam 306 at the inner edge of the waste strip 304.

The nature of the seam formed according to the method and apparatus of Fig. 1 is shown in Figs. 6 and 7. Thus in Fig. 6 the lower and upper layers 24 and 26 are fused together at their outer edges at 102. This outer fused region 102, which is relatively close to the electrically heated welding member 38 during the formation of the seam, is believed to be completely melted and fused together so that the original boundary between the layers would be indistinguishable. A fusion bond is also formed over a substantial distance from the outer edge of the material at 102 back toward the main body of the material, as indicated by the welded or fused junction 110. At some point spaced a substantial distance away from the edge 102, the relative heat applied by the cutting and welding member 38 will not have penetrated sufficiently to form a bond. The bond is believed to be one of decreasing strength the farther one moves from the outer edge 102. Thus at point 112 there is no bond whatsoever between the upper and lower layers, so that the material may be opened up and spread out flat as indicated in Fig. 7. In this situation the fused seam or bead 102 projects a substantial distance away from the common plane of the flat layers 24 and 26. The relative extent of this projection, as compared to the thickness of the material, may be controlled to some extent by variation in the angle of attack of the welding member as illustrated in Figs. 4 and 5, and also by adjustment of the temperature and speed of movement of the welding element. Ordinarily, for seams of strength comparable to the material itself, the bead 102 will project from the common plane of the welded sheets a distance which is several times greater than the individual thickness of the sheets.

The present invention accordingly makes it possible to vary the nature of the seam obtained with any given material by suitable angular adjustment of the longitudinal main body portion of an electrically heated conducting wire with respect to its actual path of movement through the material. In addition to the angular adjustability of the longitudinally extending welding member, other important features of the invention include the provision of a relatively long main body portion extending in the plane of the material and in the direction of relative movement between the material and the member. It should be noted that this main body portion has at least one flat lateral face, the depth of which is greater than the thickness of the layers of material to be handled and which is preferably of substantially rectangular cross section with the sides or axis of greatest thickness substantially perpendicular to the plane of the material.

The method of the present invention includes not only the relative movement of a heated resistance wire longitudinally or axially through the material and in the plane of the material, but also includes the operation of the welding element at a temperature within the range between 900° F. and 2000° F. and particularly at a temperature somewhat above the ignition or burning point of the material. The method and apparatus of this invention are particularly useful in the cutting and welding of superimposed layers of polyethylene which have an individual thickness in the range between .0005 and .010 inch.

A method and apparatus have accordingly been described which accomplish the objects set forth at the beginning of the present specification and which make it possible to provide superior seams between layers of thermoplastic material with relative ease and economy of manufacture.

Changes and modifications may be made in the specific structure and arrangement of the parts, in the light of the teachings of this application. The present invention is accordingly intended to include all such modifications and improvements as fall within the spirit and scope of the attached claims.

Now, therefore, I claim:

1. The method of cutting and welding superimposed layers of thin thermoplastic sheet material which comprises superimposing two of said layers with their surfaces in parallel face-to-face engagement and with their free edges projecting in the same direction, and simultaneously cutting said layers along a predetermined path spaced inwardly of said edges and seaming the upper and lower layers to each other along the edge of said path by moving a longitudinal section of electrically heated resistance wire longitudinally of the wire through both layers of the material while maintaining the wire in the plane of said layers and substantially coincident with said path.

2. The method of cutting and welding superimposed layers of thin thermoplastic sheet material which comprises superimposing two of said layers with their surfaces in parallel face-to-face engagement and with their free edges projecting in the same direction, and simultaneously cutting and seaming said layers along a predetermined path spaced inwardly of said edges by moving a longitudinal section of electrically heated resistance wire substantially along its own axis through both layers of the material while maintaining the wire in the plane of said layers with the axis of the wire extending along said path and also maintaining the wire at a temperature severing the material ahead of said wire before the material reaches said wire.

3. The method of cutting and welding superimposed layers of thin thermoplastic sheet material which comprises superimposing two of said layers with their surfaces in parallel face-to-face engagement and with their free edges projecting in the same direction, and simultaneously cutting and seaming said layers along a predetermined path spaced inwardly of said edges by moving a longitudinal section of electrically heated resistance wire substantially along its own axis through both layers of the material while maintaining the wire in the plane of said layers, and controlling the thickness of the resulting seam by changing slightly the angular adjustment of the wire in said plane until the leading and trailing parts of the wire move along laterally spaced but directly adjacent portions of said path.

4. Apparatus for cutting and welding superimposed layers of thin thermoplastic sheet material comprising a supporting surface, means for guiding two layers of the material in superimposed face-to-face engagement along said surface, said surface having a cut-away portion therein, a resistance wire of greater thickness than said two layers located at said cut-away portion and extending generally along said surface, one edge of the wire projecting below the surface and another edge projecting above the two layers carried on said surface, means providing for relative movement of the superimposed layers along said surface in a path substantially coinciding with the longitudinal axis of said wire, and means for passing an electric current longitudinally of the wire and thereby heating the wire directly and accurately to a temperature melting and severing the individual layers ahead of the wire and fusing said layers to each other along said path during relative movement of the wire axially through said material.

5. Apparatus according to claim 4 including adjustable supporting means for said wire, said adjustable means providing for angular movement of the wire in the plane of said surface between a position in which the longitudinal axis of the wire exactly coincides with the direction of said relative movement and at least one other position in which said wire axis is slightly inclined with respect to said direction.

6. Apparatus for cutting and seaming superimposed layers of thermoplastic sheet material comprising a resistance wire of greater transverse thickness than the layers to be seamed, support means for holding the layers in superimposed face-to-face engagement with their free edges projecting in the same direction in a given plane, means mounting the wire with a substantial portion of its length lying in the given plane, means providing for relative movement of the wire through the material along a path lying in said plane and spaced inwardly from the free edges of said layers, with the longitudinal axis of said wire portion substantially coinciding with said path, and means for passing an electric current longitudinally through said portion of the wire along the direction of said relative movement in said plane and thereby directly heating said portion and accurately maintaining it at a desired seaming temperature.

7. Apparatus according to claim 6 in which the wire is substantially rectangular in cross section, with its sides of greatest thickness substantially perpendicular to said plane and extending both above and below said layers.

8. Apparatus for cutting and seaming superimposed layers of thermoplastic sheet material comprising a resistance wire having a front portion, a rear portion and a longitudinal intermediate body portion with at least one flat lateral face whose depth is greater than the thickness of the material layers, means for connection of the front and rear portions to an electric power source for direct and accurate heating of the wire by current passed therethrough, support means for holding the layers in superimposed face-to-face engagement in a plane extending longitudinally of said wire at a level intersecting said flat face, thereby locating the longitudinal axis of said body portion in said plane with said face extending both above and below said layers, and means providing for relative movement of said wire with respect to said layers along a path substantially in the plane of the longitudinal axis of the wire and coincident therewith.

9. Apparatus according to claim 8 in which the power source connection means provides a current heating the wire to a temperature severing the material ahead of the wire before the material touches said wire.

10. Apparatus for cutting and welding superimposed layers of thermoplastic sheet material comprising a resistance wire having a main body portion extending substantially parallel to the plane of the material and upwardly curved front and rear portions at each end of said body, means for passing a current through the wire and thereby directly and accurately heating it to a temperature high enough to melt and sever the material, and means guiding the material for relative movement longitudinally of the main body portion and substantially in the plane of said body portion, said curved front portion melting and severing the individual layers of material along the path of relative movement, and the main body portion and curved rear portion fusing together the severed edges of the adjacent superimposed layers along said path.

References Cited in the file of this patent

UNITED STATES PATENTS

| | | |
|---|---|---|
| 2,232,640 | Schwartzman | Feb. 18, 1941 |
| 2,389,560 | Steffens | Nov. 20, 1945 |
| 2,425,388 | Oestricher | Aug. 12, 1947 |
| 2,516,552 | Clark | July 25, 1950 |
| 2,535,029 | Atanasoff et al. | Dec. 26, 1950 |
| 2,546,164 | Norris | Mar. 27, 1951 |
| 2,556,476 | Lamport | June 12, 1951 |
| 2,627,213 | Nye | Feb. 3, 1953 |